UNITED STATES PATENT OFFICE.

FRANK S. CULVER, OF WASHINGTON, DISTRICT OF COLUMBIA, ASSIGNOR, BY DIRECT AND MESNE ASSIGNMENTS, OF TWO-THIRDS TO NEWTON H. CULVER, OF DETROIT, MICHIGAN, AND CARROLL B. HOFFMAN, OF BALTIMORE, MARYLAND.

FIREPROOFING COMPOSITION.

SPECIFICATION forming part of Letters Patent No. 495,149, dated April 11, 1893.

Application filed April 4, 1892. Serial No. 427,738. (No specimens.)

*To all whom it may concern:*

Be it known that I, FRANK S. CULVER, a citizen of the United States, residing at Washington, in the District of Columbia, have invented certain new and useful Improvements in Fireproofing Compositions, &c., of which the following is a specification.

My invention relates to fire-proofing compositions, and to a backing slab, sheet, or body made thereof and adapted to be used as a backing or support for plaster for the plastering of walls, partitions, &c.

My invention has reference more particularly to fire-proof plaster boards. The composition consists of the ingredients stated below in substantially the proportion set forth, said proportions being by weight; it is, however, to be understood that I do not restrict myself arbitrarily to the proportions stated, but reserve the right to vary the same within reasonable limit.

Formula:—Asbestus or talc fiber, twelve per cent.; plaster of paris, fifty-seven per cent.; gypsum cement, thirty per cent.; jute, hemp, or the like, one per cent. These proportions are found to give excellent results, and are deemed best under ordinary circumstances, but may be varied according to the conditions of use.

The ingredients above recited, in approximately the proportions stated, are mixed together in a dry state and then worked in a pug mill, or otherwise, until made into the consistency of mortar. The material is then introduced into a mold and is troweled, after which a darby is run over it to give it a true surface. The composition is permitted to partially set, when the face of it is scratched to give a rough surface for the wall plaster. The asbestus fiber, plaster-of-paris, and gypsum cement produce a fire-proof composition.

What I consider new in the art is the use of large quantities of asbestus, or talc fiber, with enough plaster-of-paris to cement the asbestus together and act as a filling for the whole mass, thus making a somewhat spongy, flexible, elastic slab.

It will be readily understood that twelve per cent. of asbestus would more than equal in bulk the fifty-seven per cent. of plaster-of-paris, and it is a very light, fluffy material, and will probably equal over sixty per cent. of the entire composition in bulk. In all other plaster boards of this nature the main ingredient is plaster-of-paris, and the fibers are put in small quantities only for the purpose of binding the mass together. I find by the use of large quantities of asbestus in this material the slab, owing to its spongy nature, will bend over inequality of timbers and will not break or fracture, nor will the shrinkage cause cracks in the wall plaster, as would be the case if it were made of plaster-of-paris alone.

While it is contemplated and preferred that the composition be made into the form of a slab or sheet, it is obvious that it may be used in other ways; cast in solid bricks, for instance, as used for the construction of interior walls.

By the term "gypsum cement" as herein used, I mean a non-hydraulic cement of which gypsum is the main element, and which consists essentially of three parts of gypsum to one of clay. Such a cement is found in a natural state in some section and is an article of trade at the present time. The presence or absence of other ingredients in small quantities is of no consequence in the carrying out of the invention.

Asbestus fiber and talc fiber may, for the purposes of the present invention, be considered the equivalents of each other, and hence when I refer in the claims to "asbestus fiber," I mean to include asbestus fiber or its described equivalent, the talc fiber.

Having thus described my invention, what I claim is—

1. The herein described fire-proofing composition, consisting of asbestus fiber, plaster of paris, and gypsum cement with a binding fiber of jute or hemp, substantially in the proportions stated.

2. The herein described fire-proofing composition consisting of a relatively large quantity of asbestus fiber, and a quantity of plaster of paris and gypsum cement sufficient to form a filling and bind the mass together without destroying the flexibility thereof, the proportions being substantially as set forth.

In witness whereof I hereunto set my hand in presence of two witnesses.

FRANK S. CULVER.

Witnesses:
 F. W. PRATT,
 WARDER VOORHEES.